Patented Dec. 3, 1946

2,412,054

UNITED STATES PATENT OFFICE 2,412,054

NYLON FILAMENTS

William R. McClellan, Wilmington, Del., assignor to E. I. du Pont de Nemours & Company, Wilmington, Del., a corporation of Delaware No Drawing. Application October 25, 1943, Serial No. 507,609

1 Claim. (Cl. 8—115.5)

This invention relates to artificial filaments and more particularly to filaments of the nylon type.

The high molecular weight synthetic linear polyamides known as nylon have been modified with phenolic resins for the manufacture of monofils used in brushes, and particularly in paint brushes. The stiffness of the monofil is materially improved by this means which makes possible the manufacture of brushes with smaller diameter bristles but with the same brush stiffness. In addition the presence of the phenolic resin improves the drawing properties of the nylon which is of especial importance in the production of paint brush bristles since with most types of nylon the drawing of tapered bristles is practicable only at low taper ratios. Another advantage of the modified nylon resides in the fact that the bristles can be drawn at the higher temperatures where the best drawing properties are realized, and the resulting curl incident to such drawing easily removed by subsequent water-setting treatments. In the case of unmodified nylon this undesirable curl cannot be removed entirely. The phenol-formaldehyde resins also markedly improve the resistance of nylon to degradation by heat and light which is of importance in brush manufacture since the phenol resin-containing bristles are not embrittled as are the unmodified bristles by the vulcanization of the rubber which secures the bristles to the brush handle.

Although the phenol resin-modified bristles possess the several advantages mentioned above there have been two drawbacks to their wide use in brush manufacture. One of these drawbacks is the ready extraction of the resin by certain paint and lacquer solvents with resulting decrease in bristle stiffness, and the other is the insufficient recovery of the phenol resin-modified bristles from sharp bending of the kind to which toothbrushes and many industrial brushes are subjected.

Several methods have been proposed or tried heretofore to render the phenolic resins in the polyamide monofil nonextractable by organic solvents, but for various reasons these methods are less desirable than the new process described herein. These previously suggested methods together with the difficulties accompanying them are as follows: The resin can be insolubilized and the monofil made infusible by treatment with diisocyanates which is best accomplished by exposing the bristle to a solution of the diisocyanate, such as hexamethylene diisocyanate or methylene bis(p-phenylisocyanate), in an inert solvent such as kerosene or benzene and in the presence of a catalyst such as triethylamine or other tertiary amine, and then to bake the bristle while held at fixed length in an oven at 100°–200° C. The disadvantages of this method are that diisocyanates are not commercially available and, that since they are quite toxic materials, great care must be taken in their handling. Another method for making the modifying resin non-extractable has been to treat the monofils with agents such as dimethylolurea and N,N'-bis(methoxymethyl)-uron in the presence of acid catalysts, but these agents give somewhat less satisfactory results for this purpose than the diisocyanates.

A further method which can be used in obtaining monofils containing non-extractable phenolic resins but which yield monofils of lower stiffness and poorer recovery from bending than those obtained by the process claimed herein, consists in impregnating a nylon monofil with a water solution of the first stage water-soluble reaction product of a heat-hardenable phenolic resin and then baking the impregnated monofil. This result may be accomplished with a solution prepared by carrying out the reaction between a phenol and an aldehyde, preferably with an aldehyde to phenol molar ratio of 1.5:1 to 5.0:1, in the presence of water and an acid type catalyst, such as oxalic acid, formic acid, ammonium chloride, etc., to the stage at which all of the resin formed is still soluble in the reaction medium on cooling to 20° C. The monofil is then exposed to this solution for a length of time determined by the amount of resin which it is desired to incorporate into the monofil. After the impregnation, the monofil is removed from the bath and heated in an oven at 100°–200° C. until the resin is no longer extractable by organic solvents. This treatment also renders the resin-modified polyamide monofil infusible, probably by virtue of the fact that the resin has functioned partially to crosslink polyamide chains.

This invention has as an object the production of improved nylon bristles. A further object is to reduce the effect of organic solvents on the stiffness of oriented monofils of phenolic resin modified nylon. A further object is the manufacture of phenol resin-modified nylon monofils which have improved recovery from bending. Further objects reside in methods for treating the phenol resin-modified nylon bristles to render the resin non-extractable in organic solvents and to improve recovery of the bristle from sharp bending. Other objects will appear hereinafter.

The above objects are accomplished by the process more fully described hereinafter which comprises heating with aqueous alkali solution nylon monofils containing nylon-compatible phenol-aldehyde resin while the filaments are held at fixed lengths.

Examples of the alkali solutions used in the practice of this invention are those of compounds of the alkali or alkaline earth metals, for instance aqueous solutions having a pH above 8.0 of the hydroxides of these metals and of their basic salts.

The best method of practicing the invention is as follows: The oriented polyamide monofil containing more than 5% but not more than 30%, and preferably 10% to 20% of the phenolic resin, is treated while held at fixed length, first with water, which can be steam or liquid water of at least 85° C., until the filament is set in the shape it was treated, and then while still held at fixed length with a 5% to 10% aqueous solution of barium hydroxide, or of other alkali of the kind mentioned above, for a period of from 0.1 to 2 hours at a temperature above 85° C. After the treatment, the bristle is rinsed in water to remove any alkaline deposit. By this treatment the resin is not only rendered non-extractable by common paint and lacquer solvents, but in most cases the solvents have less softening action on the treated resin-modified bristle than on unmodified polyamide bristle.

The objects of the invention are most fully accomplished when the modifying phenolic resins are those of low molecular weight which do not become infusible on heating for short periods of time at 275° to 285° C. and which are acid catalyzed products of formaldehyde and unsubstituted phenol in a formaldehyde to phenol molar ratio of from 0.5:1 to 1.0:1. It is desirable from the standpoint of tenacity and recovery to carry out the spinning and drawing of the bristle in a continuous operation and then to water set the bristle immediately after drawing. When the highest possible bristle stiffness is desired and recovery is of minor importance, it is best to draw the monofil after several days' aging.

The following examples are further illustrative of methods for practicing the invention.

*Example I*

An oriented bristle containing 20 parts of phenol-formaldehyde resin and 80 parts of polyhexamethylene adipamide was wrapped on a reel and exposed for one hour to boiling water. The bristles while still wrapped on the reel were then exposed for one hour to a boiling solution containing 95 parts of water and 5 parts of sodium hydroxide. The modified phenolic resin used was prepared with a formaldehyde to phenol molar ratio of 0.75 to 1.0 by condensing 900 parts of phenol with 580 parts of 37% aqueous formaldehyde solution in the presence of 9 parts of ammonium chloride and 10 parts of oxalic acid as the catalyst.

The per cent angle of deformation retained on sharp bending of the water set bristle was 20% while the water set and alkali treated bristle was only 4%. Exposure of the water set control bristle to boiling acetone for 8 hours reduced the modulus of elasticity (stiffness) from 900,000 lbs./sq. in. to 250,000 lbs./sq. in. The alkali treatment reduced the stiffness of the bristle from 900,000 lbs./sq. in. to 650,000 lbs./sq. in., but subsequent exposure of the bristle for 8 hours to boiling acetone failed to reduce the stiffness further.

The per cent angle of deformation retained on sharp bending as referred to above is the recovery, or bending resilience, of a bristle which is measured by wrapping the bristle several complete turns around a mandril 0.11" in diameter and holding in this position for two minutes, releasing, and determining the per cent angle of deformation remaining after one hour.

*Example II*

An oriented bristle containing 80 parts of polyhexamethylene adipamide and 20 parts of phenol-formaldehyde resin was wrapped on a reel and exposed for one hour to boiling water. After removal of a sample to be used as the water set control bristle, the remaining bristle on the reel was exposed for one hour to a boiling solution of 95 parts of water and 5 parts of barium hydroxide. For comparison, a sample of bristle without the water setting treatment was given this same treatment with the hot aqueous alkali. The modified phenolic resin was prepared as described in Example I excepting that the formaldehyde to phenol molar ratio was 0.85 to 1.0 instead of 0.75 to 1.0.

The per cent angle of deformation remaining from bending of the water set bristle was reduced from 18% to 13% by the alkali treatment and the stiffness was not appreciably changed. The bristle which was alkali set without the intermediate water setting treatment had about the same recovery but had wet and dry stiffnesses 15% to 30% lower than the bristle which was water set before the alkali treatment.

The stiffness of the alkali treated bristle was not measurably changed after 30 days' exposure at 25° C. to each of the following solvents: Turpentine, benzene, acetone, butyl alcohol and ethyl acetate. This would indicate that the solvents neither extracted the resin from the bristle nor plasticized the bristle. After 15 days' exposure at 25° C. to 95% ethyl alcohol, the stiffness of the water set control bristles was reduced from 880,000 lbs./sq. in. to 140,000 lbs./sq. in., while that of the alkali treated bristle was reduced to only 520,000 lbs./sq. in. Exposure of unmodified polyhexamethylene adipamide bristle to ethyl alcohol for the same length of time reduces the stiffness from 460,000 lbs./sq. in. to 170,000 lbs./sq. in. Exposure of the unmodified bristle for 15 days to benzene and turpentine at 25° C. reduced the stiffness from 470,000 lbs./sq. in. to 380,000 lbs./sq. in. and 300,000 lbs./sq. in., respectively, while acetone, butyl alcohol and ethyl acetate had no softening action on the unmodified polyhexamethylene adipamide bristle.

The above data was obtained with a lower member of each particular class of solvent selected since it would have a stronger action in extracting resin from bristle than a higher member; for example, of common ester solvents, ethyl acetate would have a considerably stronger solvent or extraction action towards the phenolic resins than would ethyl butyrate, butyl butyrate, amyl acetate, amyl butyrate, etc.

*Example III*

An oriented bristle containing 85 parts of hexamethylene adipamide and 15 parts of o-cyclohexyl phenol-formaldehyde resin was treated as described for the bristle of Example I, excepting that the alkali solution contained 10 parts of sodium hydroxide instead of 5 parts. The modifying resin was prepared with a formaldehyde to phenol molar ratio of 0.7 to 1.0 by condensing 100 parts of o-cyclohexylphenol with 32.5 parts of 37% aqueous formaldehyde solution in the presence of 2 parts of 37% hydrochloric acid as the catalyst. The per cent angle of deformation remaining from bending of the bristle was reduced from 25% to 10% by the alkali treatment and the bristle stiffness was not appreciably changed. The stiffness of the alkali treated bristle was unchanged after exposure to boiling acetone for 8 hours while that of the water set control bristle was reduced from 700,000 lbs./sq. in. to 500,000 lbs./sq. in. by the same treatment.

*Example IV*

An oriented bristle containing 80 parts of polyhexamethylene adipamide and 20 parts of phenol-formaldehyde resin was treated as described for the bristle of Example III. The modifying resin is a commercial resin which is an acid condensed p-tertiary-butylphenol-formaldehyde resin prepared with a formaldehyde to phenol ratio of about 0.7 to 1.0.

The alkali treated bristle was unchanged in stiffness after exposure to boiling acetone for 8 hours while the stiffness of the bristle which was only water set was reduced from 680,000 lbs./sq. in. to 250,000 lbs./sq. in. by the same acetone treatment.

*Example V*

An oriented bristle containing 80 parts of polyhexamethylene sebacamide and 20 parts of phenol-formaldehyde resin described in Example I was treated as described for the bristle of Example II. The alkali treatment reduced the per cent angle of deformation remaining from bending from 25% to 18%.

In general, the best results are obtained with hydroxides of metals such as barium, sodium, potassium and lithium, but the effect is also realized with 5% to 10% aqueous solutions of the salts of these metals, preferably salts of weak acids, e. g. sodium carbonate and acetate.

The method which has given the best results and the most convenient one to use in this invention is to treat the resin modified polyamide monofil with a boiling aqueous solution containing 5%-10% of the metal hydroxide or salt and continuing the treatment until the resin is rendered non-extractable by boiling acetone. With alkali metal hydroxides, temperatures of from 85° C. up to the softening point of the resin modified polyamide can be used.

In some cases the boiling alkali solution slowly extracts resin from the monofil. This occurs most readily when a strong alkali such as sodium hydroxide is used with a bristle containing a very low molecular weight resin. Under these circumstances, 1%-5% of the resin is usually extracted by the boiling alkali, but the treatment is stopped before more than 20% of the resin is extracted. Another method which may be used is to impregnate the monofil with alkali from a cold solution and then to heat treat the impregnated monofil.

The resin modified polyamides used in spinning the filaments which are further treated in accordance with this invention are usually obtained by one of two methods. One of these methods involves coating of polyamide chips of the type commonly used for polyamide spinning, with resin prior to spinning. This may be accomplished either by mixing the correct proportion of polyamide chip and resin in a mixer heated above the melting point of the resin or by mixing in the same manner at room temperature of polyamide chip with a concentrated solution of the resin (30-60%) in acetone or alcohol and then removing the solvent to obtain a uniform resin coating. This is the preferred method since, if the resin has any tendency to decompose or has any deleterious effect in degrading molten polyamide, the resin and polyamide are in contact at the high temperatures used in spinning for a minimum time. The other method comprises mixing the phenolic resin and a concentrated aqueous solution of polyamide-forming ingredients and polymerizing the resultant mixture in the fashion described in United States Patent No. 2,130,948.

The suitability of the modifying resin used in the present process is determined by the compatibility of the resin with the polyamide within the previously mentioned 5% to 30% resin in the polyamide. The most compatible resins are prepared with unsubstituted phenols and with acid type catalysts with an aldehyde to phenolic compound molar ratios of 0.5:7.0 to 1.0:1.0. The acid catalyzed ortho and para substituted phenols, however, are valuable in the production of resins compatible with the nylon. If phenol is replaced by alkylated phenols of increasing molecular weight, the formaldehyde to phenol ratio must be decreased to maintain compatibility with polyamides. For example, p-tertiary-butylphenol-formaldehyde resin prepared with a formaldehyde to phenol ratio of 0.90 to 1.0 is compatible to an extent of less than 5% with polyhexamethylene adipamide while the resin prepared with formaldehyde to phenol ratio of 0.75 to 1.0 is compatible to an extent of over 30%. With still further increase in molecular weight of the phenol, a p-octylphenol-formaldehyde resin with a formaldehyde to phenol ratio of 0.75 to 1.0 is incompatible with polyhexamethylene adipamide while one with a formaldehyde to phenol ratio of 0.5 to 0.1 is highly compatible. Other suitable substituted phenols are cresol, amylphenol, and phenylphenol.

The synthetic linear polyamides referred to herein are of the general type described in United States Patents Nos. 2,071,250, 2,071,253 and 2,130,-948. These polyamides can be drawn under tension in the solid state with permanent and high linear extension to yield filaments and fibers showing by X-ray examination molecular orientation along the fiber axis.

The polyamides referred to above, generally speaking, comprise the reaction product of a linear polymer-forming composition containing amide-forming groups, for example, reacting material consisting essentially of bifunctional molecules, each containing two reactive groups which are complementary to reactive groups in other molecules and which include complementary amide-forming groups. These polyamides can be obtained by the methods given in the above mentioned patents and by other methods, for example, by self-polymerization of a monoamino-monocarboxylic acid, by reacting a diamine with a dibasic carboxylic acid in substantially equimolecular amounts, or by reacting a monoamino-monohydric alcohol with a dibasic carboxylic acid in substantially equimolecular amounts, it being understood that reference herein to the amino acids, diamines, dibasic carboxylic acids and amino alcohols is intended to include the equivalent amide-forming derivatives of these reactants. Both the simple and modified polyamides, for example those obtained by including glycols with the reactants, contain the recurring amide groups

in which X is oxygen or sulfur and R is hydrogen or a monovalent hydrocarbon radical, as an integral part of the main chain of atoms in the polymer. On hydrolysis with hydrochloric acid the amino acid polymers yield the amino acid hydrochloride, the diamine-dibasic carboxylic acid polymers yield the diamine hydrochloride and the dibasic carboxylic acid, and the amino alcohol-dibasic acid polymers yield the amino alcohol hydrochloride and the dibasic carboxylic acid.

The resin modified polyamide monofils which have been treated with alkali solution as described herein are particularly useful in paint brushes because of their improved stiffness and other advantages previously mentioned. They are valuable in tooth, hair and industrial brushes because of the better penetrating action. The monofils and filaments obtained by the present process are also useful for cordage, insect screening, filter cloth and for tire cords where strength at high temperature is important.

As many apparently widely different embodiments of this invention may be made without departing from the spirit and scope thereof, it is to be understood that I do not limit myself to the specific embodiments thereof except as defined in the appended claim.

I claim:

A process for obtaining improved filaments composed of synthetic linear polyamide containing 10% to 20% of a phenol-formaldehyde resin which does not become infusible on heating for short periods at 275° C. to 285° C., and which is the acid catalyzed reaction product of the phenol and formaldehyde in a molar ratio within 0.5:1.0 and 1.0:1.0, said process comprising treating said filaments in the molecularly oriented state while held at fixed length with water at a temperature of at least 85° C. until the filaments are set in the shape treated, and then while the filaments are still held at fixed length subjecting them to the action of hot 5% to 10% aqueous alkali solution at a temperature above 85° C., said solution having a pH above 8.0 and being that of a compound selected from the group consisting of the hydroxides of the metals barium, sodium, potassium and lithium and of the carbonates and acetates of said metals, and continuing the treatment with said alkali solution until at least 1% but not more than 20% of said resin is extracted.

WILLIAM R. McCLELLAN.

Certificate of Correction

Patent No. 2,412,054. December 3, 1946.

WILLIAM R. McCLELLAN

It is hereby certified that error appears in the printed specification of the above numbered patent requiring correction as follows: Column 6, line 23, for "0.5:7.0" read *0.5:1.0*; and that the said Letters Patent should be read with this correction therein that the same may conform to the record of the case in the Patent Office.

Signed and sealed this 11th day of February, A. D. 1947.

[SEAL]

LESLIE FRAZER,
*First Assistant Commissioner of Patents.* with the reactants, contain the recurring amide groups

in which X is oxygen or sulfur and R is hydrogen or a monovalent hydrocarbon radical, as an integral part of the main chain of atoms in the polymer. On hydrolysis with hydrochloric acid the amino acid polymers yield the amino acid hydrochloride, the diamine-dibasic carboxylic acid polymers yield the diamine hydrochloride and the dibasic carboxylic acid, and the amino alcohol-dibasic acid polymers yield the amino alcohol hydrochloride and the dibasic carboxylic acid.

The resin modified polyamide monofils which have been treated with alkali solution as described herein are particularly useful in paint brushes because of their improved stiffness and other advantages previously mentioned. They are valuable in tooth, hair and industrial brushes because of the better penetrating action. The monofils and filaments obtained by the present process are also useful for cordage, insect screening, filter cloth and for tire cords where strength at high temperature is important.

As many apparently widely different embodiments of this invention may be made without departing from the spirit and scope thereof, it is to be understood that I do not limit myself to the specific embodiments thereof except as defined in the appended claim.

I claim:

A process for obtaining improved filaments composed of synthetic linear polyamide containing 10% to 20% of a phenol-formaldehyde resin which does not become infusible on heating for short periods at 275° C. to 285° C., and which is the acid catalyzed reaction product of the phenol and formaldehyde in a molar ratio within 0.5:1.0 and 1.0:1.0, said process comprising treating said filaments in the molecularly oriented state while held at fixed length with water at a temperature of at least 85° C. until the filaments are set in the shape treated, and then while the filaments are still held at fixed length subjecting them to the action of hot 5% to 10% aqueous alkali solution at a temperature above 85° C., said solution having a pH above 8.0 and being that of a compound selected from the group consisting of the hydroxides of the metals barium, sodium, potassium and lithium and of the carbonates and acetates of said metals, and continuing the treatment with said alkali solution until at least 1% but not more than 20% of said resin is extracted.

WILLIAM R. McCLELLAN.

Certificate of Correction

Patent No. 2,412,054. December 3, 1946.

WILLIAM R. McCLELLAN

It is hereby certified that error appears in the printed specification of the above numbered patent requiring correction as follows: Column 6, line 23, for "0.5:7.0" read *0.5:1.0*; and that the said Letters Patent should be read with this correction therein that the same may conform to the record of the case in the Patent Office.

Signed and sealed this 11th day of February, A. D. 1947.

[SEAL]

LESLIE FRAZER,
*First Assistant Commissioner of Patents.*